United States Patent [19]

Hayama et al.

[11] Patent Number: 5,210,736
[45] Date of Patent: May 11, 1993

[54] MOBILE RECORDING-MEDIUM PLAYING APPARATUS

[75] Inventors: Akira Hayama; Toshiyuki Fukami, both of Saitama; Tomohito Mizuno, Tokyo, all of Japan

[73] Assignee: Pioneer Electronic Corporation, Tokyo, Japan

[21] Appl. No.: 774,228

[22] Filed: Oct. 10, 1991

[30] Foreign Application Priority Data

May 13, 1991 [JP] Japan .................................. 3-107649

[51] Int. Cl.⁵ .................................................. G11B 1/00
[52] U.S. Cl. ..................................... 369/75.1; 360/137
[58] Field of Search ................. 369/75.1, 77.1, 77.2; 360/92, 93, 105, 137

[56] References Cited

U.S. PATENT DOCUMENTS

| | | | |
|---|---|---|---|
| 3,824,472 | 7/1974 | Engel et al. | 360/93 |
| 4,365,280 | 12/1982 | Crosetti et al. | 360/137 |
| 4,369,478 | 1/1983 | Sato et al. | 360/137 |
| 4,584,717 | 4/1986 | Strickland | 360/137 |
| 4,656,551 | 4/1987 | Gotto | 360/137 |
| 4,807,292 | 2/1989 | Sorscher | 360/137 |

FOREIGN PATENT DOCUMENTS 4008536 10/1990 Fed. Rep. of Germany .

*Primary Examiner*—Edward P. Westin
*Assistant Examiner*—Stephone B. Allen
*Attorney, Agent, or Firm*—Sughrue, Mion, Zinn, Macpeak & Seas

[57] ABSTRACT

The present invention is directed to a structure in which an operation panel is removably provided on the front surface of a housing having a recording-medium playing mechanism provided therein, so that when the operation panel is separated from the housing, the recording medium is ejected from the housing and a recording medium insertion opening is closed when the recording medium is pulled out, or the opening is closed after the recording medium is reloaded in the case where the recording medium is not pulled out.

9 Claims, 2 Drawing Sheets

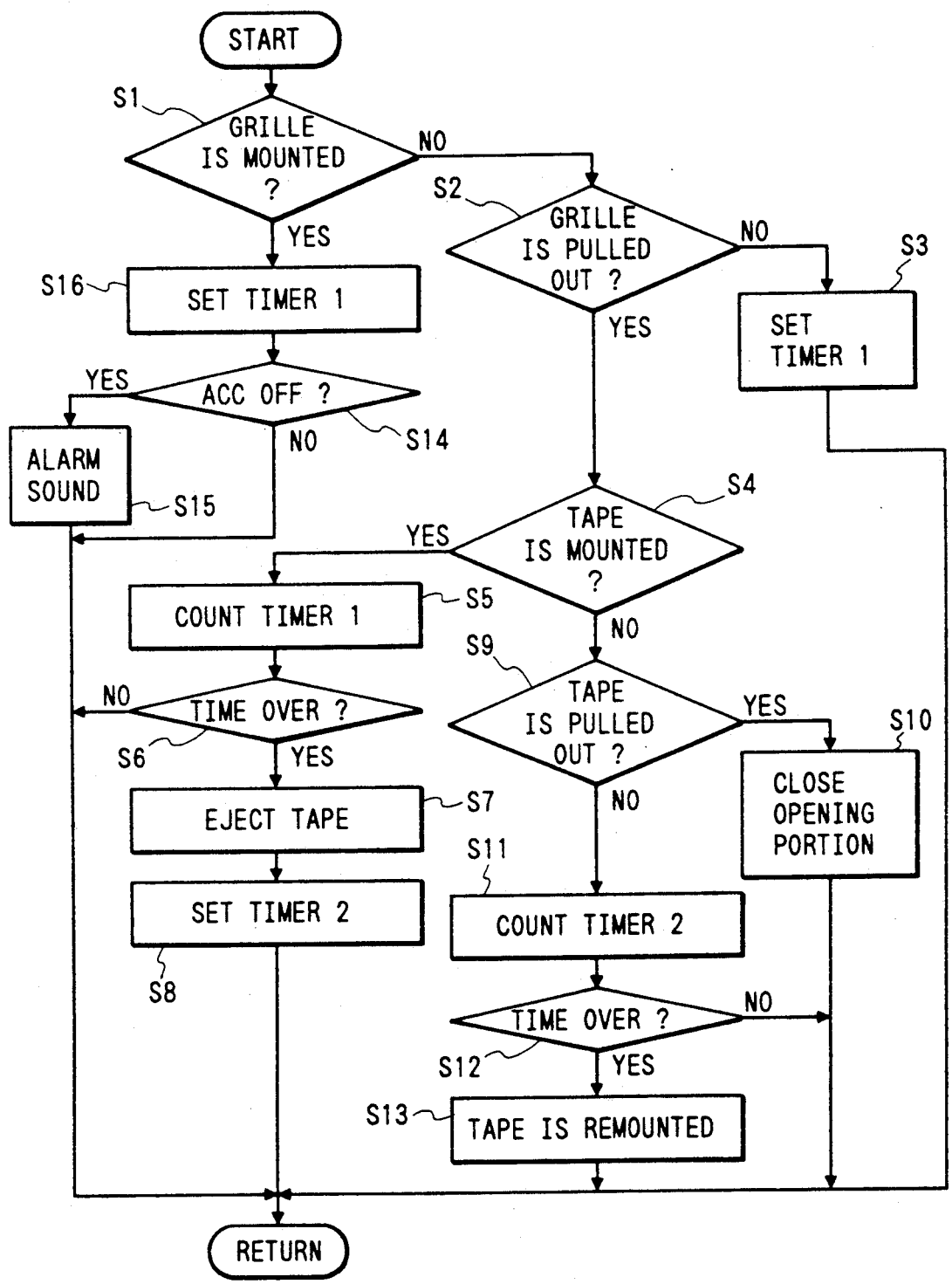

MOBILE RECORDING-MEDIUM PLAYING APPARATUS

FIELD OF THE INVENTION

The present invention relates to a recording-medium playing apparatus and particularly relates to a mobile recording-medium playing apparatus in which an operation or control panel is made removable from a body of the player to thereby provide an antitheft feature.

BACKGROUND OF THE INVENTION

Mobile recording-medium playing apparatuses, such as a car stereo system, having a player for playing a cassette tape, a compact disc, or other such recording mediums, are widely known in the art. One type of mobile recording-medium playing apparatus utilizes a control panel (hereinafter referred to as a "grille") that may be removed from the housing of the player when not in use. Thus, the presence of a stereo system is concealed and it appears that no car system is mounted in the car when the car is left unattended. The system proves to be an excellent antitheft device.

In such an apparatus, however, when a recording medium is being inserted, the recording medium visibly projects outwardly from the player, even after the grille has been removed. Thus, the stereo system is no longer concealed and the antitheft feature of the system is defeated. Moreover, after the grille is removed, the eject switch provided on the grille is disabled so that the recording medium cannot be ejected. Accordingly, the grille must be removed after the recording medium has been ejected. This procedure inconveniences the user who is compelled to perform such a troublesome operation.

SUMMARY OF THE INVENTION

It is, therefore, an object of the present invention to provide a mobile recording-medium playing apparatus with an antitheft function that overcomes the problems of the prior art.

The mobile recording-medium playing apparatus according to the present invention comprises: a player means for playing a recording medium supplied thereto; a housing arranged to enclose the player means and having an opening portion formed in a front surface thereof for receiving the recording medium; a conveyer means for conveying the recording medium inserted into the opening portion to the player means in accordance with a loading command, and for ejecting the recording medium from the player means to the outside of the housing in accordance with an ejection command; an operation panel removably provided on the front surface; and a control means for controlling the player means in cooperation with an operation switch carried by the operation panel and for supplying the conveyer means with the loading command and the ejection command alternatively;

the control means including a separation detection means for detecting separation of the operation panel from the housing; the playing apparatus further comprises an ejection command generation means for supplying the conveyer means with the ejection command in response to the detection of the separation of the operation panel from the housing by means of the separation detection means.

The mobile recording-medium playing apparatus according to the present invention has the control panel removably provided on the front surface of the player housing so that, when the panel is separated therefrom, the recording medium is ejected out of the housing. Additionally, when the recording medium is pulled out, the recording medium insertion opening portion of the housing is closed. When the recording medium is not pulled out, the recording medium is reinserted in the housing; however, the opening portion is closed.

BRIEF DESCRIPTION OF THE DRAWINGS

FIG. 2 is a flow chart to be executed by the system controller 8 in FIG. 1.

DETAILED DESCRIPTION OF THE INVENTION

Figure 1:
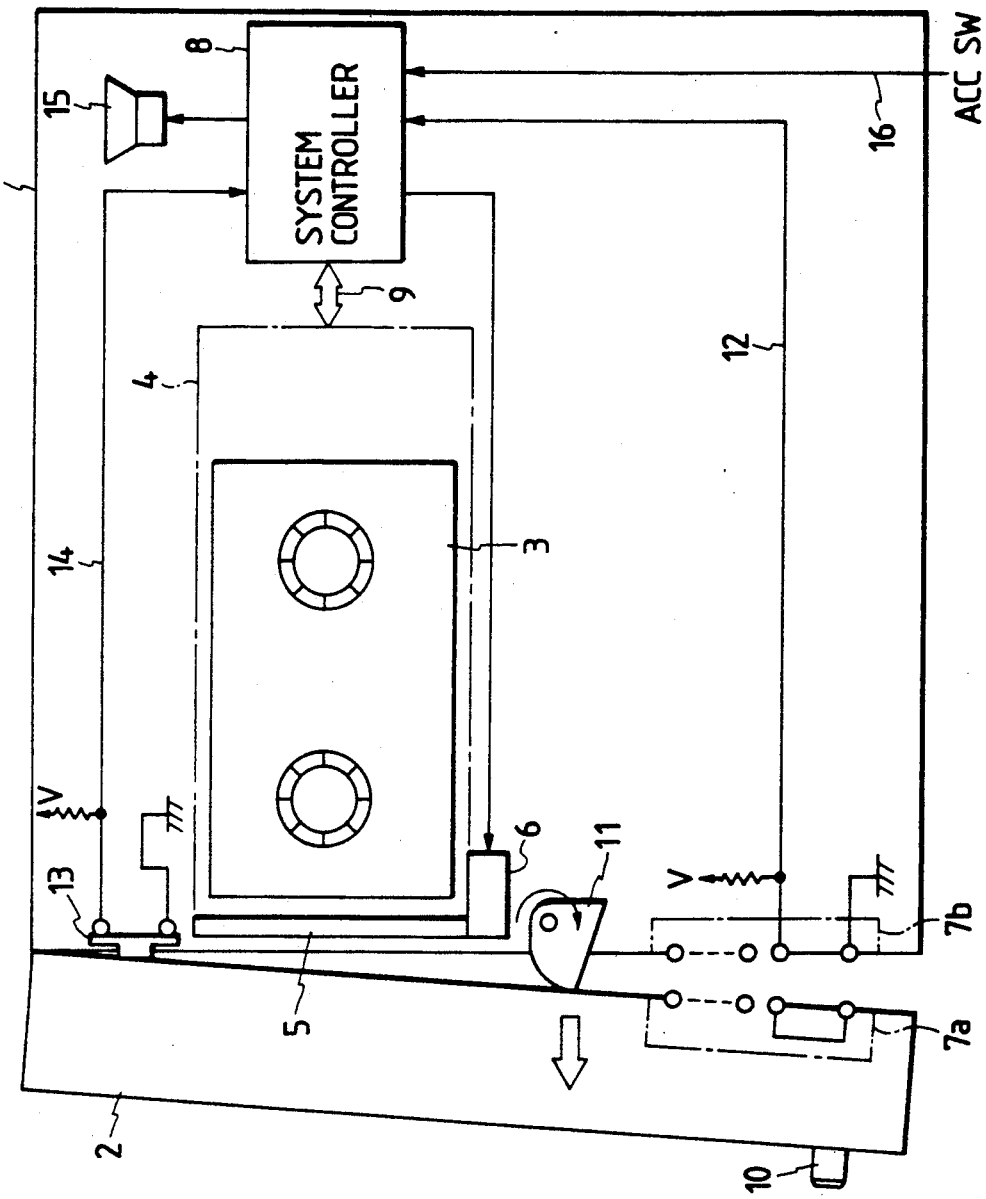
FIG. 1 is a block diagram showing the configuration of one embodiment of the present invention.

A first embodiment of the present invention will now be described in detail. FIG. 1 is a schematic diagram of a mobile recording-medium playing apparatus in the form of a cassette tape player for playing a cassette tape. In this cassette tape player, a grille 2 is removably mounted on a front surface of a housing 1, which is the body of the player. A player mechanism 4 for playing a cassette tape 3 is provided in the housing 1. The player mechanism 4 is any one of the conventional mechanisms known in the art, and includes tape reels, a magnetic head, a capstan motor, a servo circuit, a signal processing circuit, etc., (all of which need not be shown in the drawings). The housing 1 is provided with a conveyer mechanism (not shown) for conveying the cassette tape 3 inserted into an opening portion (not shown) of the housing 1 to a predetermined playing position in accordance with a loading command. The conveying mechanism is also used for ejecting the cassette tape 3 from the opening portion to the outside of the housing 1 in accordance with an ejection command. A cassette door 5 is provided at the opening portion, and is caused to close or open the opening portion by means of a opening/closing driving portion 6.

An operation switch (not shown) is provided on the grille 2 for the operator to input information to a system controller 8, which is provided as a control unit in the housing 1. The input information is communicated through a detachable connector 7a provided in the vicinity of one end of the front surface of the grille 2 and a detachable connector 7b provided on the front surface of the housing 1 so as to be coupled with the detachable connector 7a. The operation switch allows the operator to control the operation of the cassette tape player through a bus 9 which connects the system controller 8 with the player mechanism 4.

The grille 2 can be secured to the housing 1 by a stopper mechanism consisting of a pair of hold members provided at the opposite ends of the front surface of the housing 1. The lock may be released by a release button 10 on the front of the grille 2. By pushing the release, the grille 2 is pushed out by a grille push-out mechanism 11 within the housing 1, and the detachable connector 7a and the detachable connector 7b are separated from each other so that the level of a signal line 12 is inverted from a low level to a high level (V). When the system controller 8 detects the fact that the grille 2 has been separated from the housing 1 (i.e., signal level 12 shifts to loco level), the controller shifts its mode from a normal operation mode into an antitheft mode regardless of the information from the operation switch. A switch 13, which moves to the off position when the grille 2 has separated completely from the housing 1, is provided on the front surface of the housing 1 at the end position opposite to the position of the detachable connector 7b. The level of a signal line 14 is inverted from a low level into a high level (V) so that the system controller 8 can detect the fact that the grille 2 has separated completely from the housing 1.

Additionally, a piezo-electric buzzer 15 generates an information sound, such as an alarm sound or the like, in response to an information signal from the system controller 8. Also, a signal line 16 is sent to the system controller 8 from an accessory switch when a car key is inserted in the ignition, but the signal terminates when the key is pulled out.

The operation of the apparatus shown in FIG. 1 will now be described with reference to FIG. 2. The system controller 8 shifts its operation at all times into a subroutine for antitheft to watch the state of mount/dismount of the grille 2 while the system controller 8 performs normal playback operation. When the release switch 9 is operated so that the one end of the grille 2 is pushed out by the release button 10 from the housing 1, the system controller 8 detects that the grille 2 has been released or dismounted (step S1). The system controller 8 further determines whether the grille 2 has been completely pulled out from the housing 1 (step S2). If the grille 2 has not yet completely pulled out, the system controller 8 sets a timer (step S3) and returns to the main playback routine. If the grille 2 has separated completely (in the step 2), the system controller 8 detects whether the cassette tape 3 is mounted in a predetermined mount position or not (step S4). If the cassette tape 3 is mounted, the system controller 8 checks the timer (in step S5) so that the system controller 8 can determined whether a predetermined time has been exceeded (step S6). If the time has been exceeded, the system controller 8 outputs an ejection command to the conveyer mechanism (step S7), sets the timer (step S8), and returns to the main routine. If the time has not been exceeded in step 6, the system controller 8 returns to the main routine.

Although the cassette tape 3 is ejected to the outside of the housing 1 in accordance with the ejection command, the ejected part of the cassette tape is less than half of the tape body, and thus more than half of the cassette remains inside the housing 1. Consequently, after it is determined that the cassette tape 3 is not mounted in the predetermined position, the system controller 8 determines whether the cassette tape 3 has been pulled out completely (step S9). If the cassette tape 3 has been pulled out completely, the system controller 8 outputs a closing command to the opening/closing driving portion 6 of the cassette door 5 so as to close the opening portion (step 10). If the cassette tape 3 has not been pulled out completely, the system controller 8 checks the timer (step S11) and determines whether the time has been exceeded (step S12). If the time has been exceeded, the system controller 8 outputs a loading command to the conveyer mechanism to reload the cassette tape 3 which has been ejected (step S13).

If it is determined that the grille 2 has not been released, but is inserted completely (step S1), the system controller 8 sets the timer (step S16) and determines whether the accessory switch is in an "on" state or in an "off" state (step S14). If the accessory switch is in an "off" state, the system controller 8 outputs an information signal to the piezo-electric buzzer 15 (step S15) and returns to the main routine. If the accessory switch is in an "on" state, the system controller 8 returns to the main routine.

Thus, when the grille 2 is removed from the housing body, the cassette tape 3 is automatically ejected and the opening portion which is an inlet for insertion of a cassette tape is automatically closed by the cassette door 5. Accordingly, the cassette tape player is concealed in the car, thereby realizing the antitheft feature.

Although the piezo-electric buzzer 15 is used as the information unit, any other sound generating member may be used so long as the member may generate an information sound, or a display mechanism such as a light emitting diode (LED) may be used as the information unit so that light is used in place of sound by turning the display mechanism on and off.

As a second embodiment of the invention, a shutter may be provided in place of the cassette door 5 so that the shutter may cover the whole front surface of the housing 1 in accordance with an instruction from the system controller 8 after the cassette tape 3 has been pulled out or has been reloaded. In this case, the detachable connector 7a is also made to disappear so that no remnants of a car stereo system is visible, thereby providing a more complete antitheft feature.

Although the above description has been made using a cassette tape player for playing a so-called "C-cassette" of the cartridge type, the present invention may alternatively be applied to a playing apparatus for playing other types of recording mediums, such as digital audio tape (DAT), compact disc (CD), etc.

As described above, the mobile recording-medium playing apparatus according to the present invention includes an operation panel removably provided on the front surface of a housing having a recording-medium playing mechanism provided therein, so that when the operation panel is separated from the housing, the recording medium is ejected to the outside of the housing and an recording medium insertion opening is closed when the recording medium is pulled out, or the opening is closed after the recording medium is automatically reloaded when the recording medium is not pulled out. Accordingly, after the removal of the operation panel, it is impossible from the outside of the car, to know that the recording-medium playing apparatus is housed in the car. It is, therefore, possible to improve the antitheft features of mobile record medium playing apparatuses.

What is claimed is:

1. A mobile recording-medium playing apparatus comprising:
   a player means for playing a recording medium supplied thereto; a housing arranged to enclose said player means and having an opening portion formed in a front surface thereof for receiving said recording medium;
   a conveyer means for conveying said recording medium inserted into said opening portion to said player means in accordance with a loading command and for ejecting said recording medium from said player means to the outside of said housing in accordance with an ejection command;
   an operation panel removably provided on said front surface;
   a control means for controlling said player means in cooperation with said operation panel, and for supplying said conveyer means with said loading command and said ejection command, wherein said control means includes a separation detection means for generating a separation detection signal upon detecting separation of said operation panel from said housing, and said playing apparatus; and an ejection command generation means for supplying said conveyer means with said ejection command in response to said separation detection signal.

2. A mobile recording-medium playing apparatus according to claim 1, further comprising:

an ejection detection means for generating an ejection detection signal upon detecting ejection of said recording medium by means of said conveyer means; and an information means for generating an information signal in response to said ejection detection signal.

3. A mobile recording-medium playing apparatus according to claim 1, further comprising:

an opening/closing means for opening/closing said opening portion; and a pull-out detection means for generating a pull-out detection signal upon detecting pull-out of said recording medium out of said housing, wherein said opening/closing means is supplied with a command to close said opening portion in response to said pull-out detection signal.

4. A mobile recording-medium playing apparatus according to claim 1, further comprising:

a shutter for covering said front surface; and a pull-out detection means for generating a pull-out detection signal upon detecting pull-out of said recording medium out of said housing, said shutter being supplied with a command to cover said front surface in response to said pull-out detection signal.

5. A mobile recording-medium playing apparatus according to claim 1, further comprising:

an ejection detection means for generating an ejection detection signal upon detecting ejection of said recording medium by means of said conveyer means;

a pull-out detection means for generating a pull-out detection signal upon detecting pull-out of said recording medium out of said housing; and a loading command generation means for supplying said loading command to said conveyer means when said loading command generation means does not receive said pull-out detection signal within a predetermined time after reception of said ejection detection signal.

6. A mobile recording-medium playing apparatus according to claim 1, further comprising:

a hold means for holding said operation panel;

a release means for releasing holding of said operation panel;

a release detection means for generating a release detection signal upon detecting release of holding of said operation panel; and an information means for generating an information signal upon detection of an off-state of an accessory switch before generation of said release detection signal.

7. A method of concealing a mobile recording-medium playing apparatus comprising the steps of:

detecting when an operational panel of the playing apparatus has been removed from said apparatus;

removing a recording-medium from a loaded position and ejecting said recording-medium from said playing apparatus;

determining whether or not the recording-medium has been removed from the playing apparatus within a predetermined period of time;

reloading the recording-medium into said playing apparatus after said predetermined period of time if said medium has not been removed.

8. The method of concealing a recording-medium set forth in claim 7, wherein said playing apparatus has a front portion moveable in an opened or closed position relative to said apparatus, and said ejecting step further comprises the steps of:

placing said front portion in said opened position; and forcing said recording-medium through said front portion until said recording-medium partially extends outwardly from said playing apparatus.

9. The method of concealing a recording-medium set forth in claim 8, wherein said reloading step further comprises the steps of:

retracting said recording-medium through said front portion until said recording-medium no longer extends outwardly from said playing apparatus; and placing said front portion in said closed position.

* * * * *